United States Patent
Bong (10) Patent No.: US 10,344,637 B2
(45) Date of Patent: Jul. 9, 2019

(54) METHOD OF PREVENTING BEARING SEIZURE AND VEHICLE USING THE SAME

(71) Applicants: Hyundai Motor Company, Seoul (KR); Kia Motors Corporation, Seoul (KR)

(72) Inventor: Ha-Dong Bong, Gyeonggi-do (KR)

(73) Assignees: Hyundai Motor Company, Seoul (KR); Kia Motors Corporation, Seoul (KR)

(*) Notice: Subject to any disclaimer, the term of this patent is extended or adjusted under 35 U.S.C. 154(b) by 42 days.

(21) Appl. No.: 15/855,471

(22) Filed: Dec. 27, 2017

(65) Prior Publication Data

US 2019/0112952 A1    Apr. 18, 2019

(30) Foreign Application Priority Data

Oct. 17, 2017 (KR) .................. 10-2017-0134407

(51) Int. Cl.
| | |
|---|---|
| *F02D 35/02* | (2006.01) |
| *F01L 3/24* | (2006.01) |
| *F01L 1/047* | (2006.01) |
| *F01L 13/00* | (2006.01) |
| *F02D 41/22* | (2006.01) |

(52) U.S. Cl.
CPC ............... *F01L 3/24* (2013.01); *F01L 1/047* (2013.01); *F01L 13/0015* (2013.01); *F02D 35/027* (2013.01); *F02D 41/22* (2013.01); *F01L 2001/0476* (2013.01); *F02D 2041/227* (2013.01); *F02D 2200/024* (2013.01); *F02D 2200/101* (2013.01)

(58) Field of Classification Search
CPC ......... F01L 1/344; F01L 1/46; F01L 13/0015; F01L 2013/115; F02D 35/027; F02D 41/22; F02D 2041/227; F02D 2041/228; F02D 2200/024; F02D 2200/1002
USPC ......... 73/114.57, 114.79, 114.81; 123/90.15, 123/198 DA
See application file for complete search history.

(56) References Cited

U.S. PATENT DOCUMENTS

| | | | | |
|---|---|---|---|---|
| 3,508,629 A | * | 4/1970 | Haworth | F01D 21/04 184/6 |
| 6,871,499 B1 | * | 3/2005 | Allen | F02B 37/10 417/407 |

FOREIGN PATENT DOCUMENTS

KR    2015-0026416 A    3/2015

* cited by examiner

*Primary Examiner* — Jorge L Leon, Jr.
(74) *Attorney, Agent, or Firm* — Mintz Levin Cohn Ferris Glovsky and Popeo, P.C.; Peter F. Corless (57) ABSTRACT

A method of preventing bearing seizure may include using at least one of a knock sensor, an engine oil pressure sensor, and a continuously variable valve timing (CVVT) system as a bearing seizure detection factor by a bearing controller, detecting damage of a bearing applied to an engine during operation of the engine in which a state of the bearing seizure detection factor is changed, and performing engine control using the bearing seizure detection factor when the bearing damage is detected.

19 Claims, 9 Drawing Sheets

METHOD OF PREVENTING BEARING SEIZURE AND VEHICLE USING THE SAME

CROSS-REFERENCE TO RELATED APPLICATION

This application claims under 35 U.S.C. § 119(a) the benefit of Korean Patent Application No. 10-2017-0134407, filed on Oct. 17, 2017, is the entire contents of which are incorporated herein by reference.

BACKGROUND

(a) Technical Field

The present disclosure relates to bearing damage control, more particularly, to a vehicle capable of detecting bearing damage by monitoring a bearing to prevent bearing seizure that may cause total engine failure.

(b) Description of Related Art

In general, a bearing performs important functions such as reducing noise and vibration, and promoting fuel efficiency while enabling a rotary body to rotate at high speed or in a silent manner by freely supporting the rotary body.

Particularly, since a vehicle includes various rotary systems rotating at high speed, it requires bearings for the rotary systems. Accordingly, it is important to prevent bearing damage and bearing seizure.

By way of example, the damage to bearings used for an engine rotary system (e.g., a connecting rod for connection of a piston and a crankshaft) is one cause of increase in engine frictional resistance, and the increase in engine frictional resistance brings about a lack of engine power. As a result, when an accelerator pedal is pressed to increase engine power in the state in which the engine frictional resistance is increased, the speed of the engine is increased together with the temperature of the bearing due to an increased amount of air. For this reason, bearing damage may develop into bearing seizure.

Therefore, the vehicle bearing is connected to a lubrication structure configured to effectively supply lubricant in order to prevent bearing seizure due to overheating while maintaining bearing durability so as to prevent bearing damage.

However, since bearing damage may develop into bearing seizure when foreign substances (e.g., metal chips) are caught or accumulated, it is necessary to cope with bearing seizure in addition to the lubricant supply structure.

Particularly, the increase in engine speed occurring when the accelerator pedal is pressed in a state in which the engine frictional resistance is increased increases the bearing temperature to a melting temperature together with an increase in engine temperature, thereby accelerating bearing seizure. This may result in total engine failure that makes it impossible to repair the engine, which may develop into engine destruction.

Moreover, since bearing seizure is one of the causes of engine stall, it may cause a problem that impacts vehicle safety.

SUMMARY

An embodiment of the present disclosure is directed to a method of preventing bearing seizure, capable of previously detecting bearing damage by detecting bearing seizure detection factors through an abnormal signal detected by a knock sensor, a pressure difference detected by an oil pressure sensor, and continuous monitoring of a continuously variable valve timing (CVVT) follow-up angle in a CVVT system when an engine is operated, and particularly of effectively preventing engine stall that may result in a vehicle safety problem together with bearing seizure causing a total engine failure in various combinations such as independent control or connection control of bearing seizure detection factors, and a vehicle using the same.

Other objects and advantages of the present disclosure can be understood by the following description, and become apparent with reference to the embodiments of the present disclosure. Also, it is obvious to those skilled in the art to which the present disclosure pertains that the objects and advantages of the present disclosure can be realized by the means as claimed and combinations thereof.

In accordance with an embodiment of the present disclosure, a method of preventing bearing seizure includes using each of a knock sensor, an engine oil pressure sensor, and a CVVT system as a bearing seizure detection factor by a bearing controller, detecting damage of a bearing applied to an engine during operation of the engine in which a state of the bearing seizure detection factor is changed, and performing engine control using the bearing seizure detection factor when the bearing damage is detected.

The bearing seizure detection factor may include a knock sensor abnormality signal detected by the knock sensor, an oil pressure value detected by the engine oil pressure sensor, and CVVT following of the CVVT system. The change in the state of the bearing seizure detection factor may be detected by monitoring the knock sensor, the engine oil pressure sensor, or the CVVT system.

The knock sensor may be independently used as the bearing seizure detection factor, or may be used in a combination with the engine oil pressure sensor or the CVVT system as the bearing seizure detection factor.

The knock sensor may be used as the bearing seizure detection factor in a single sensor mode for the detection of the bearing damage. The single sensor mode may be divided into a single sensor mode, in which the bearing damage is detected by reflecting a knock sensor abnormality signal detected by the knock sensor and a degree of ignition timing retard in a cylinder of the engine, and a single sensor mode in which the bearing damage is detected by reflecting a strength of the knock sensor abnormality signal detected by the knock sensor.

The single sensor mode may be performed by (A) determining a load of the engine when the knock sensor abnormality signal is detected by the knock sensor, (B) determining a noise level of the knock sensor abnormality signal when a condition of the engine load is satisfied, (C) counting the number of times the noise level occurs as a sensor cycle when a condition of the noise level is satisfied, (D) checking the cylinder of the engine in which the ignition time is retarded when the number of times the noise level occurs reaches a condition of the sensor cycle count, (E) turning on a warning light to inform of the bearing damage while switching to a limp-home mode of the CVVT system by checking the bearing damage when the cylinder is checked, and (F) limiting an RPM of the engine.

In the single sensor mode, the condition of the engine load may be a vehicle speed, the condition of the noise level may be a peak noise level, the condition of the sensor cycle count may be three cycles when cumulative specific times of the peak noise level is set as one cycle, the RPM may be divided into a lower limit RPM and an upper limit RPM, the lower limit RPM may be an RPM at which the engine is stalled, and the upper limit RPM may be an RPM at which the bearing is not fused in the limp-home mode.

The single sensor mode may be performed by (G) determining knock of the engine when the knock sensor abnormality signal is detected by the knock sensor, (H) determining the signal strength by applying a filter to the knock sensor abnormality signal when a condition of the engine knock is not satisfied, (I) turning on a warning light to inform of the bearing damage while switching to a limp-home mode of the CVVT system by checking the bearing damage when a condition of the signal strength is satisfied, and (J) limiting an RPM of the engine.

In the single sensor mode, the condition of the engine knock may be a lambda region frequency, the filter may be a band pass filter, and the RPM may be an upper limit RPM at which the bearing is not fused in the limp-home mode.

The knock sensor and the engine oil pressure sensor may be used as the bearing seizure detection factor in a double sensor mode for the detection of the bearing damage. The double sensor mode may be performed to detect the bearing damage by reflecting a knock sensor abnormality signal detected by the knock sensor and an oil pressure signal detected by the engine oil pressure sensor.

The double sensor mode may be performed by (K) satisfying a condition of a noise level of the knock sensor abnormality signal in a state in which a condition of a load of the engine is satisfied when the knock sensor abnormality signal is detected by the knock sensor and then checking the knock sensor abnormality signal as a detection signal when the number of times the noise level occurs reaches a condition of a sensor cycle count, (L) calculating a difference between an oil model value and a measured oil pressure value when the oil pressure signal is detected by the engine oil pressure sensor, checking an engine oil pressure drop signal when a condition of the oil pressure difference is satisfied, (M) turning on a warning light to inform of the bearing damage while switching to a limp-home mode of the CVVT system by checking the bearing damage when the knock sensor abnormality signal and the engine oil pressure drop signal are simultaneously detected, and (N) limiting an RPM of the engine.

In the double sensor mode, the condition of the engine load may be a vehicle speed, the condition of the noise level may be a peak noise level, the condition of the sensor cycle count may be three cycles when cumulative specific times of the peak noise level is set as one cycle, the condition of the oil pressure difference may be a pressure correction value, and the RPM may be a default RPM of the CVVT system to the engine.

The knock sensor and the CVVT system may be used as the bearing seizure detection factor in a combined sensor mode for the detection of the bearing damage. The combined sensor mode may be performed to detect the bearing damage by reflecting a knock sensor abnormality signal detected by the knock sensor and a CVVT follow-up angle of the CVVT system.

The combined sensor mode may be performed by (O) satisfying a condition of a noise level of the knock sensor abnormality signal in a state in which a condition of a load of the engine is satisfied when the knock sensor abnormality signal is detected by the knock sensor and then checking the knock sensor abnormality signal as a detection signal when the number of times the noise level occurs reaches a condition of a sensor cycle count, (P) satisfying a condition of the CVVT follow-up angle of the CVVT system in a state in which a condition of an RPM of the engine is satisfied and then checking a CVVT follow-up angle abnormality signal when the number of times abnormality of the CVVT follow-up angle occurs reaches a condition of a system cycle count, (Q) turning on a warning light to inform of the bearing damage while switching to a limp-home mode of the CVVT system by checking the bearing damage when the knock sensor abnormality signal and the CVVT follow-up angle abnormality signal are simultaneously detected, and (R) limiting the RPM of the engine.

In the combined sensor mode, the condition of the engine load may be a vehicle speed, the condition of the noise level may be a peak noise level, the condition of the sensor cycle count may be three cycles when cumulative specific times of the peak noise level is set as one cycle, the RPM may be divided into a lower limit RPM and an upper limit RPM, the lower limit RPM may be an RPM at which the engine is stalled, and the upper limit RPM may be an RPM at which the bearing is not fused in the limp-home mode.

In the combined sensor mode, the condition of the engine RPM may be an RPM at which there is present a supply amount of engine oil that makes difficult to check CVVT following, the condition of the CVVT follow-up angle abnormality may be a follow-up angle at which the CVVT following is deteriorated, and the condition of the system cycle count may be three cycles when the CVVT follow-up angle abnormality occurring once is set as one cycle.

In accordance with another embodiment of the present disclosure, a vehicle includes an engine in which a bearing is applied to a rotary system, a CVVT system configured to control an ignition timing of the engine, a knock sensor configured to detect vibration of the engine, an engine oil pressure sensor configured to detect a pressure of oil supplied to the engine, and a bearing controller configured to use each of a knock sensor abnormality signal detected by the knock sensor, an oil pressure difference between the engine oil pressure detected by the engine oil pressure sensor and an oil model value, and CVVT follow-up angle abnormality of the CVVT system as a bearing seizure detection factor, to detect damage of the bearing from a change in state of the bearing seizure detection factor during operation of the engine, and then to perform control of the engine to prevent bearing seizure.

The bearing controller may use the knock sensor, or use a combination of the knock sensor and the engine oil pressure sensor or a combination of the knock sensor and the CVVT system, as the bearing seizure detection factor.

The bearing controller may include a single sensor map for the knock sensor, a double sensor map for the knock sensor and the engine oil pressure sensor, and a combined sensor map for the knock sensor and the CVVT system.

The bearing controller may inform of the bearing damage using a warning light.

In accordance with a further embodiment of the present disclosure, a non-transitory computer readable medium containing program instructions executed by a processor includes: program instructions that use each of a knock sensor, an engine oil pressure sensor, and a continuously variable valve timing (CVVT) system as a bearing seizure detection factor; program instructions that detect damage of a bearing applied to an engine during operation of the engine in which a state of the bearing seizure detection factor is changed; and program instructions that perform engine control using the bearing seizure detection factor when the bearing damage is detected.

DESCRIPTION OF SPECIFIC EMBODIMENTS

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the disclosure. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Throughout the specification, unless explicitly described to the contrary, the word "comprise" and variations such as "comprises" or "comprising" will be understood to imply the inclusion of stated elements but not the exclusion of any other elements. In addition, the terms "unit", "-er", "-or", and "module" described in the specification mean units for processing at least one function and operation, and can be implemented by hardware components or software components and combinations thereof.

Further, the control logic of the present disclosure may be embodied as non-transitory computer readable media on a computer readable medium containing executable program instructions executed by a processor, controller or the like. Examples of computer readable media include, but are not limited to, ROM, RAM, compact disc (CD)-ROMs, magnetic tapes, floppy disks, flash drives, smart cards and optical data storage devices. The computer readable medium can also be distributed in network coupled computer systems so that the computer readable media is stored and executed in a distributed fashion, e.g., by a telematics server or a Controller Area Network (CAN).

Exemplary embodiments of the present disclosure will be described below in more detail with reference to the accompanying drawings. The present disclosure may, however, be embodied in different forms and should not be construed as limited to the embodiments set forth herein. Rather, these embodiments are provided so that this disclosure will be thorough and complete, and will fully convey the scope of the present disclosure to those skilled in the art. Throughout the disclosure, like reference numerals refer to like parts throughout the various figures and embodiments of the present disclosure.

Figure 1:
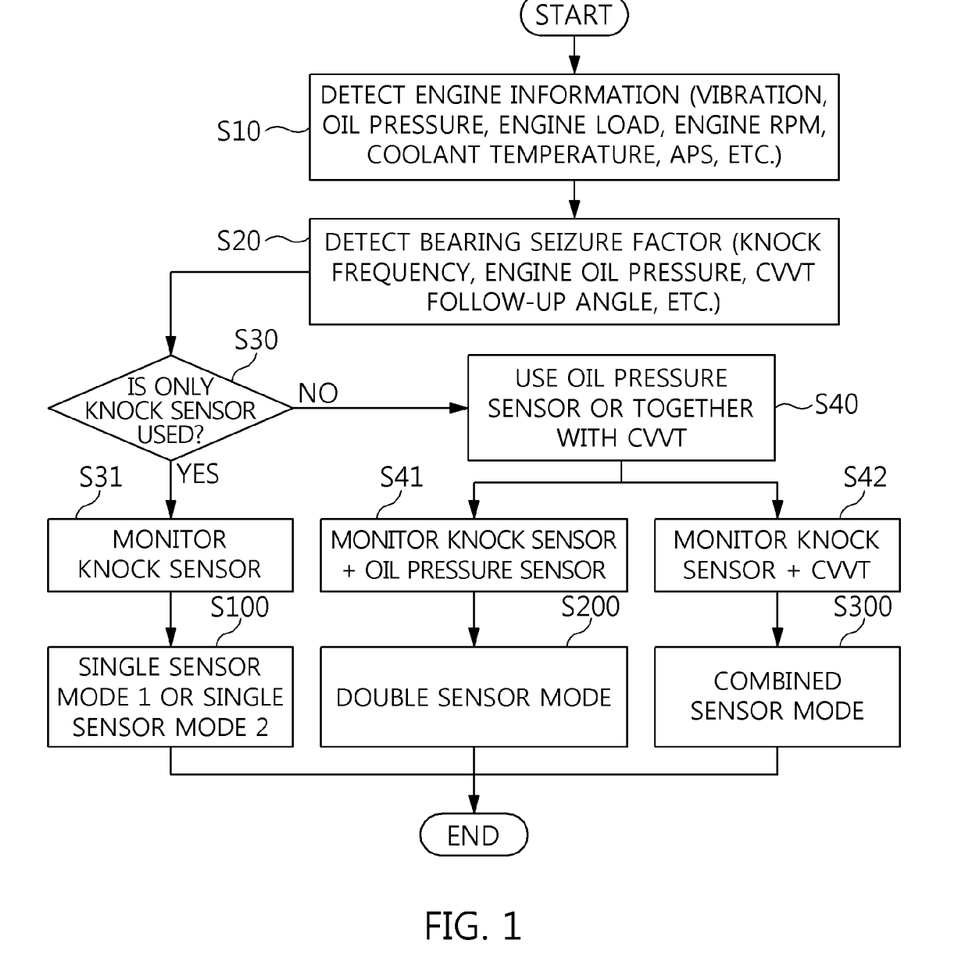
FIG. 1 is a flowchart illustrating a method of preventing bearing seizure according to an embodiment of the present disclosure.

Referring to FIG. 1, a method of preventing bearing seizure includes a step of detecting engine information S10, a step of detecting bearing seizure detection factors S20, steps of monitoring bearing seizure S30, S31, S40, S41, and S42, and steps of preventing bearing seizure S100, S200, and S300.

The method of preventing bearing seizure prevents bearing seizure causing a total engine failure from proceeding after bearing damage by previously detecting the bearing damage before bearing seizure occurs, while preventing engine stall causing a vehicle safety problem. Particularly, the method of preventing bearing seizure is characterized in that it blocks total engine failure that may progress from the following actions: pressing an accelerator pedal by a driver to resolve insufficient vehicle power causing an increase in frictional resistance due to bearing damage→increasing an amount of air→increasing an engine speed→accelerating bearing seizure due to an increase in bearing melting temperature→impossibility of repair. Here, "→" is a sign indicative of time progress of phenomena. Hereinafter a CVVT following means a CVVT operability of a CVVT system 4 that dose form a CVVT operating pressure without oil leakage.

Figure 2:
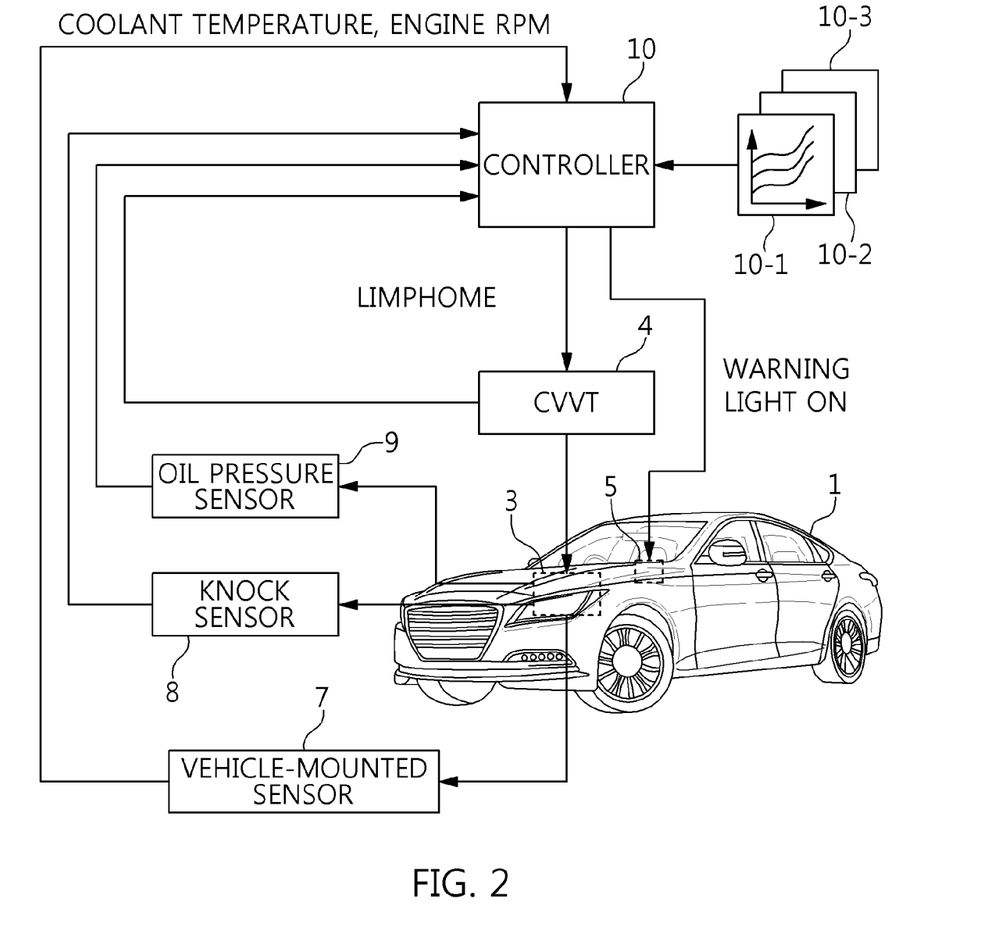
FIG. 2 is a block diagram illustrating an example of a vehicle in which a combined sensor mode is implemented according to the embodiment of the present disclosure.

Referring to FIG. 2, a vehicle 1 includes an engine 3 that generates power by combustion, a continuously variable valve timing (CVVT) system 4 that controls an ignition timing of the engine 3, a warning light 5 that is provided in a driver seat, a sensor system that detects states of devices relating to operation of the engine 3, and a bearing controller 10 that detects bearing damage.

In particular, the engine 3 converts reciprocating motion of pistons into rotary power by a rotary system, and a bearing is applied to the rotary system. In this case, the bearing is used in various places. However, since the rotary system is described as a rotary system including a reciprocating piston, a rotating crankshaft, and a connecting rod connecting them in the present embodiment, the bearing is described as a connecting rod bearing applied to the connecting rod. This is because it is necessary for the seizure of the connecting rod bearing to immediately turn on the warning light regardless of driving cycle.

In particular, the CVVT system 4 controls the ignition timing of the engine 3. Therefore, the CVVT system 4 includes a variable valve timing (VVT), a cylinder deactivation (CDA), a variable valve lift (VVL), and a continuously variable valve lift (CVVL), which adjust an opening and closing timing and an opening and closing degree of a valve according to the rotation region of the engine.

In particular, the warning light 5 informs whether the bearing applied to the rotary system of the engine 3 is damaged. To this end, the warning light 5 uses a flasher or a light-emitting diode for visual attention or a buzzer for auditory attention.

In particular, the sensor system detects the states of various devices relating to the operation of the engine 3 and provides the detected states to the bearing controller 10. To this end, the sensor system includes a vehicle-mounted sensor 7, which includes a vibration sensor, a revolution per minute (RPM) sensor, a temperature sensor, an accelerator pedal sensor, and a CVVT sensor to detect an engine vibration, an engine load, an engine speed (RPM), a coolant temperature, an accelerator position scope (APS), and a CVVT follow-up angle, a knock sensor 8 that detects an engine knock frequency, and an oil pressure sensor 9 that detects an engine oil pressure. Particularly, the knock sensor 8 uses a resonance type knock sensor that reads only vibration of a specific frequency (i.e., knock frequency), or an entire region type knock sensor that reads vibration in the entirety of wide region as in an acceleration sensor.

In particular, the bearing controller 10 detects engine information on the engine vibration, the engine load, the engine RPM, the coolant temperature, the APS, and the engine oil pressure as input data, and detects bearing seizure detection factors such as the knock frequency, the engine oil pressure, and CVVT follow-up angle as input data. Particularly, the bearing controller 10 serves to previously prevent bearing damage from proceeding to bearing seizure by preventing specific conditions causing bearing damage from developing into bearing damage using the bearing seizure detection factors.

To this end, the bearing controller 10 includes a single sensor map 10-1, a double sensor map 10-2, and a combined sensor map 10-3.

The single sensor map 10-1 includes a knock frequency matching diagram in which a frequency corresponding to an increase in knock signal is matched to white noise having vibration in the entire region to extract the specific frequency (i.e., knock frequency) of the knock sensor 8 affecting bearing seizure.

The double sensor map 10-2 includes an oil pressure matching diagram of an oil pressure model value to an actual oil pressure measurement value together with the knock frequency matching diagram of the knock sensor 8. In this case, the oil pressure model value uses a correction value obtained by correcting the pressure value, which varies depending on the type of oil used actually, the oil temperature, and the RPM, using an actual pressure sensor in the condition of the oil temperature and the specific RPM after initial starting. The reason is to reflect a variation in oil viscosity depending on the degree of dilution in the vehicle use environment. Therefore, the double sensor map 10-2 extracts the above difference between the actual oil pressure measurement value detected by the oil pressure sensor 9 and the oil pressure model value, together with the extraction of the specific frequency (i.e., knock frequency) of the knock sensor 8 affecting bearing seizure.

The combined sensor map 10-3 includes a CVVT follow-up angle matching diagram of the CVVT system 4 together with the knock frequency matching diagram of the knock sensor 8. In this case, the CVVT follow-up angle matching diagram is based on CVVT operability that does not form a CVVT operating pressure due to an increase in oil leakage caused when the gap between the bearing and the crankshaft is enlarged by bearing damage. Accordingly, the combined sensor map 10-3 extracts the CVVT follow-up angle of the CVVT system 4 together with the extraction of the specific frequency (i.e., knock frequency) of the knock sensor 8.

Accordingly, referring to FIGS. 1 and 2, in the method of preventing bearing seizure, the bearing controller 10 connected to the single sensor map 10-1 is a control subject, and the engine 3, the CVVT system 4, and the warning light 5 are a control target.

The bearing controller 10 processes the vibration signal, the engine oil pressure, the engine load, the engine RPM, the coolant temperature, the APS, the knock frequency, and the CVVT follow-up angle, which are detected by the vehicle-mounted sensor 7, the knock sensor 8, and the oil pressure sensor 9, as input data, in the step of detecting engine information S10. In the step of detecting bearing seizure detection factors S20, the knock frequency, the engine oil pressure, and the CVVT follow-up angle of the input data are detected as bearing seizure factors. As a result, the bearing controller 10 determines whether bearing seizure occurs from the current state of the knock frequency, the engine oil pressure, and the CVVT follow-up angle.

Next, the bearing controller 10 selects whether to use the knock sensor (S30), the oil pressure sensor (S40), or the combination thereof with CVVT for the bearing seizure detection factors. As a result, the knock sensor is monitored (S31) when only the knock sensor is used (S30), the knock sensor and the oil pressure sensor are monitored (S41) when the oil pressure sensor is used together with the knock sensor (S40), and the knock sensor and the CVVT are monitored (S42) when the CVVT is used together with the knock sensor (S40).

The knock sensor monitoring (S31) is performed based on the knock signal being increased by processing only a corresponding frequency affecting the knock sensor 8 from white noise (vibration or noise due to collision), having vibration in the entire region, as the vibration generated by bearing damage, whereas bearing seizure is detected by analyzing white noise in the region different from the knock noise region and detecting an excessive increase in signal in the region different from the knock noise region.

The oil pressure sensor monitoring (S41) is performed based on the engine 3 being determined to malfunction when the oil pressure value measured actually by the oil pressure sensor 9 differs from the oil pressure model value according to the driving conditions of the engine. However, since the oil pressure measured actually is also lowered by oil dilution due to fuel or a lack of oil, the accuracy of bearing seizure is maintained by applying the oil pressure sensor monitoring (S41) together with the knock sensor monitoring (S31).

The CVVT monitoring (S42) is performed based on the CVVT following of the CVVT system 4 being related to the engine oil pressure. However, it is difficult to check the engine oil pressure related to CVVT following using the CVVT following because a large amount of oil is supplied to the engine 3 at a specific RPM or more. Therefore, the accuracy of bearing seizure is maintained by applying the CVVT monitoring (S42) together with the knock sensor monitoring (S31).

Next, the bearing controller 10 is switched to a control state for each of the single sensor mode (S100) in the condition of bearing seizure by the knock sensor monitoring (S31), the double sensor mode (S200 in the condition of bearing seizure by the knock sensor/oil pressure sensor monitoring (S41), and the combined sensor mode (S300) in the condition of bearing seizure by the knock sensor/CVVT monitoring (S42).

For example, when only the knock sensor 8 is applied to the vehicle 1, bearing seizure prevention may be controlled by one of the single sensor mode (S100) and the combined sensor mode (S300). When the knock sensor 8 and the oil pressure sensor are applied to the vehicle 1, bearing seizure prevention may be controlled by one of the single sensor mode (S100), the double sensor mode (S200), and the combined sensor mode (S300). Therefore, the bearing controller 10 performs one of the single sensor mode (S100), the double sensor mode (S200), and the combined sensor mode (S300) in a fixed manner or in a variable selection manner.

Figure 3:
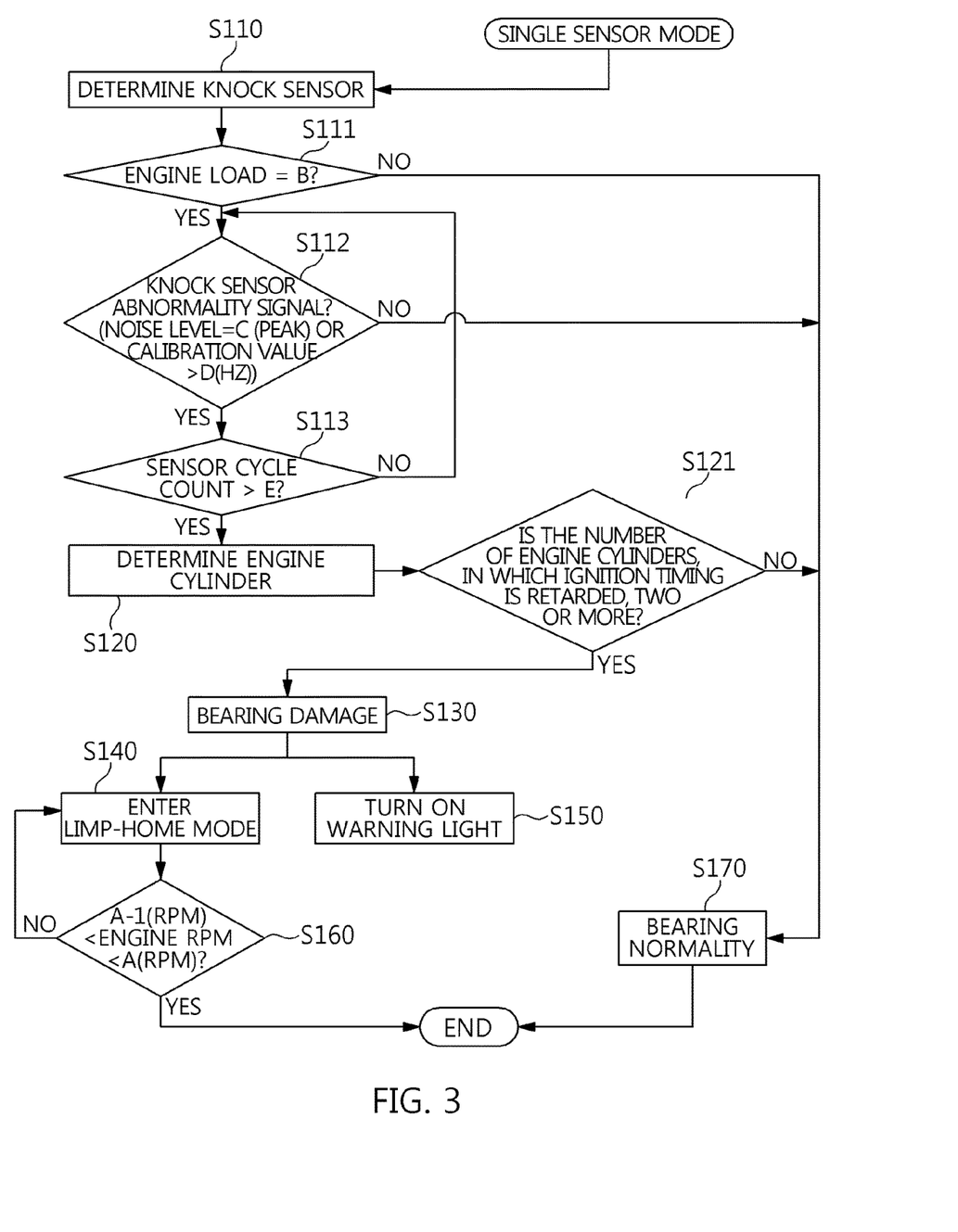
FIG. 3 is a flowchart illustrating a single sensor mode for preventing bearing seizure according to the embodiment of the present disclosure.
Figure 4:
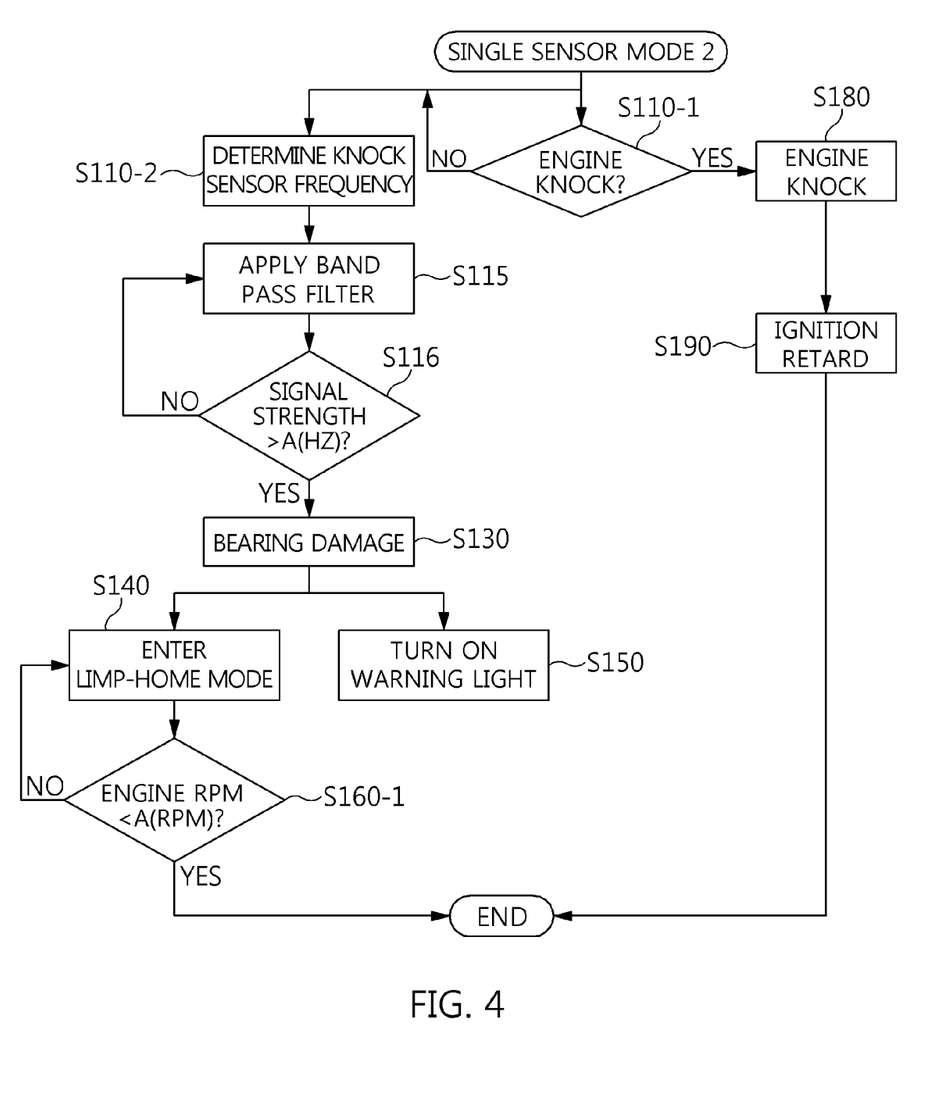
FIG. 4 is a flowchart illustrating a modified example of the single sensor mode for preventing bearing seizure according to the embodiment of the present disclosure.
Figure 5:
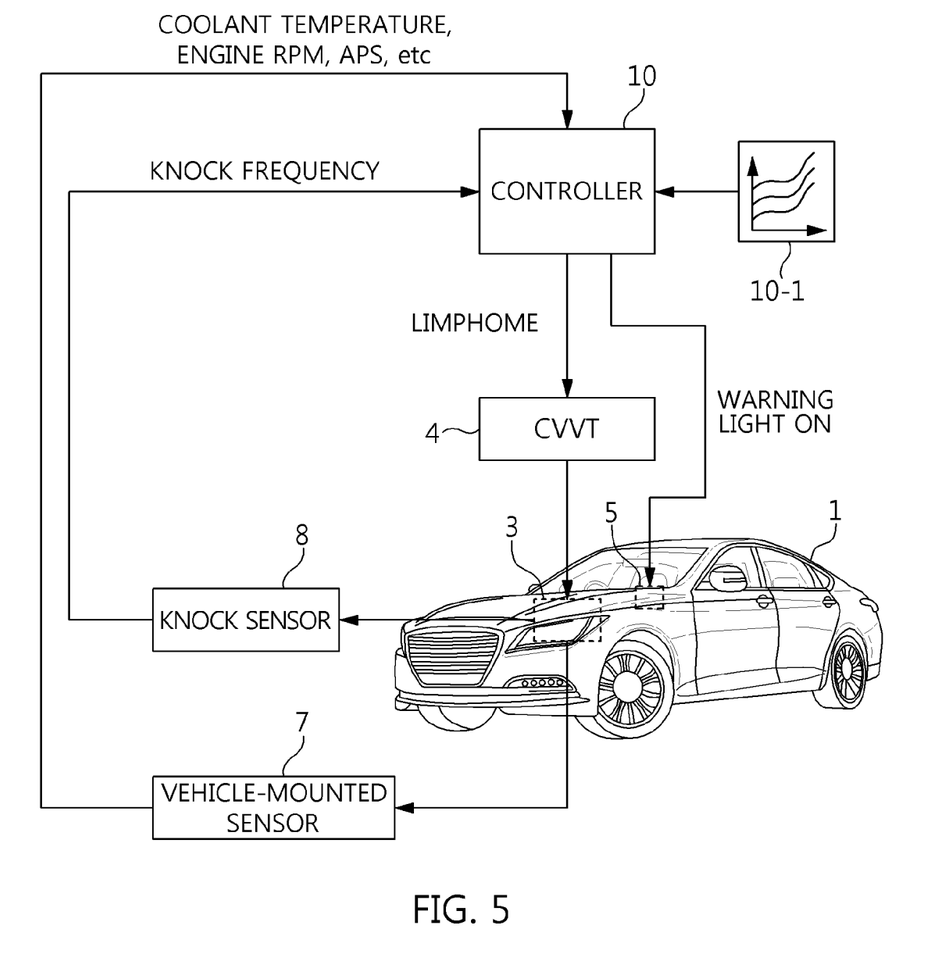
FIG. 5 is a block diagram illustrating a state in which the single sensor mode is implemented in the vehicle according to the embodiment of the present disclosure.

FIGS. 3 to 5 illustrate a method of controlling the single sensor mode and an example of the vehicle 1 using the same. Here, the single sensor mode is divided into a single sensor mode 1 (S100-1) in FIG. 3 and a single sensor mode 2 (S100-2) in FIG. 4.

Referring to FIG. 3, in the single sensor mode 1 (S100-1), it is possible to effectively prevent a possibility of miscalculation without using two or more sensors by considering cylinders (e.g., two cylinders) having a certain degree of retard or more (e.g., eight degrees of retard in the total cylinder) to reflect the characteristic of the engine 3 reflecting octane learning with low octane, based on the knock sensor 8 for detecting strong signals of metal strike due to bearing damage having impact characteristics in proportion to the engine load.

To this end, the bearing controller 10 performs a step of determining a knock sensor S110, a step of determining an engine cylinder S120, a step of checking bearing damage S130, a step of entering a limp-home mode S140, a step of turning on a warning light S150, and a step of controlling an engine RPM S160 in the single sensor mode 1 (S100-1).

Each of them is as follows.

The knock sensor determination (S110) is divided into an engine load application step S111, a knock sensor abnormality signal application step S112, and a sensor cycle application step S113, and the following equations are applied thereto.

Engine load determination: engine load=B,
Knock sensor abnormality signal detection: noise level=C or calibration value>D, and
Knock sensor abnormality signal check: sensor cycle count>E.

Here, "engine load" is an actual measurement load of the engine 3, and "B" is an engine load setting value and an engine load at a vehicle speed equal to or greater than 60 miles. "Noise level" is a noise level that is actually detected by the knock sensor 9, and "C" is a set value and a peak noise level. "Calibration value" is a frequency value that is actually detected by the knock sensor 8, and "D" is a set value and a frequency adjustment value (Hz) for calibration of the knock sensor 8. "Sensor cycle count" is the number of times, and "E" is a set value and refers to three cycles when a cumulative 100 times of the peak noise level (C) is set as one cycle.

When the engine load is not "B", and the knock sensor abnormality signal is not a set value C or is less than a set value D, the knock sensor abnormality signal is not detected so that the process is terminated by determining that the bearing is normal as in S170. On the other hand, when the engine load is "B", and the knock sensor abnormality signal is a set value C or is equal to or greater than a set value D in the knock sensor determination (S110), the knock sensor abnormality signal is determined to be detected after the sensor cycle is counted three times, so that the process proceeds to the step of determining an engine cylinder S120.

Since the process proceeds to the step of determining an engine cylinder S120 in the state in which the knock sensor abnormality signal is detected, the engine cylinder determination (S120) checks a cylinder in which the ignition timing is retarded. As a result, when the number of cylinders in which the ignition timing is retarded is less than two so that it is checked that the knock sensor abnormality is not detected, the process is terminated by determining that the bearing is normal as in S170. On the other hand, when the number of cylinders in which the ignition timing is retarded is two or more so that it is checked that the knock sensor abnormality is detected, the process proceeds to the step of checking bearing damage S130.

After the step of checking bearing damage S130, the step of entering a limp-home mode S140, the step of turning on a warning light S150, and the step of controlling an engine RPM S160 are performed according to the check of bearing damage to prevent bearing damage from proceeding to bearing seizure.

To this end, the bearing controller 10 controls the engine 3 by setting the control condition of the CVVT system 4 as a default condition to prevent bearing damage from proceeding to bearing seizure through the limp-home mode entry (S140), and warns the driver of the vehicle 1 of bearing damage by turning on the warning light (S150).

Particularly, the bearing controller 10 controls the RPM of the engine (3) in a specified state by applying the following equation in the engine RPM control (S160) after the limp-home mode entry (S140).

Engine RPM control: a−1 (RPM)<engine RPM<a (RPM).

Here, "<" is a sign of inequality indicative of the size between two values, and "a−1 (RPM)<engine RPM<a (RPM)" means that the engine RPM is larger than "a−1" and is smaller than "a". "Engine RPM" is an RPM of the engine 3 detected actually, "a−1" is an engine stall prevention RPM, and is equal to or greater than an idle RPM or is set to be about 1,000 RPM, and "a" is a bearing seizure prevention RPM, which is an RPM that does not increase the temperature of the engine 3 at which the bearing is fused, and is set to be about 2,000 RPM. However, the numerical values of "a−1" and "a" are set to be suitable for engine characteristics in consideration of safety such as engine stall.

As a result, the bearing controller 10 controls the engine 3 without engine stall even though the bearing is damaged by limiting the RPM of the engine 3 to 1,000 RPM, which is a lower limit value, in the single sensor mode 1 (S100-1) in addition to the limp-home mode when bearing seizure prevention is controlled, and further prevents bearing damage from proceeding to bearing seizure due to an increase in temperature according to the increase of the RPM of the engine 3 by limiting the RPM of the engine 3 to 2,000 RPM which is an upper limit value.

Referring to FIG. 4, the single sensor mode 2 (S100-2) uses the knock sensor 8 that detects an engine vibration signal in the entire wide region as in the acceleration sensor to use white noise having vibration in the entire region. The reason is because the knock signal is increased by processing only a corresponding frequency affecting the knock sensor 8 from white noise, having vibration in the entire region, as the vibration generated by bearing damage, whereas bearing seizure is monitored by analyzing white noise in the region different from the knock noise region and detecting an excessive increase in signal in the region different from the knock noise region.

To this end, the bearing controller 10 performs a step of determining engine knock S110-1, a step of determining knock sensor frequency S110-2, a step of checking bearing damage S130, a step of entering a limp-home mode S140, a step of turning on a warning light S150, and a step of controlling an engine RPM S160-1 in the single sensor mode 2 (S100-2).

Each of them is as follows.

The engine knock determination (S110-1) performs a step of determining whether engine knock occurs in response to the abnormal signal detected by the knock sensor 9. For example, a lambda region frequency (e.g., 6 Hz, 12 Hz) is used to determine the engine knock. In the lambda region frequency (e.g., 6 Hz, 12 Hz), it is determined that an abnormal signal is not detected from the knock sensor 8 due to bearing damage as in S180 but simple engine knock occurs. Thus, the process terminates the control after resolving the engine knock by ignition retard using engine knock logic (S190). In this case, the engine knock logic is the same as a typical logic corresponding to engine knock. On the other hand, in a frequency different from the lambda region frequency (e.g., 6 Hz, 12 Hz), it is determined that an abnormal signal may be detected from the knock sensor 8 due to bearing damage. Thus, the process proceeds to the step of determining knock sensor frequency S110-2.

In the knock sensor frequency determination (S110-2), the bearing controller 10 performs the step of determining frequency in response to the abnormal signal detected by the knock sensor 8 (S116) using a band pass filter as in S115.

For example, the band pass filter uses a frequency band less than or equal to about 5 KHz in addition to a knock frequency, and the following equation is applied to the determination of the frequency.

Knock sensor abnormality signal check: signal strength>A.

Here, "<" is a sign of inequality indicative of the size between two values, and "signal strength>A" means that the signal strength is larger than "A". "Signal strength" is a frequency (Hz) indicative of the abnormal signal detected by the knock sensor 8, and "A" is a value set by the band pass filter and refers to a frequency less than or equal to about 5 KHz.

When the bearing controller 10 checks that the knock sensor abnormality signal is detected from the signal strength indicative of a larger value than "A" through repeated determination, the process proceeds to the step of checking bearing damage S130.

After the step of checking bearing damage S130, the step of entering a limp-home mode S140, the step of turning on a warning light S150, and the step of controlling an engine RPM S160 are performed according to the check of bearing damage to prevent the bearing damage from proceeding to bearing seizure.

To this end, the bearing controller 10 controls the engine 3 by setting the control condition of the CVVT system 4 as a default condition to prevent the bearing damage from proceeding to bearing seizure through the limp-home mode entry (S140), and warns the driver of the vehicle 1 of bearing damage by turning on the warning light (S150).

Particularly, the bearing controller 10 controls the RPM of the engine (3) in a specified state by applying the following equation in the engine RPM control (S160) after the limp-home mode entry (S140).

Engine RPM control: engine RPM<a (RPM).

Here, "<" is a sign of inequality indicative of the size between two values, and "engine RPM<a (RPM)" means that the engine RPM is smaller than "a". "Engine RPM" is an RPM of the engine 3 detected actually, and "a" is a bearing seizure prevention RPM, which is an RPM that does not increase the temperature of the engine 3 at which the bearing is fused, and is set to be about 2,000 RPM. However, the numerical value of "a" is set to be suitable for engine characteristics in consideration of safety such as engine stall.

Therefore, the bearing controller 10 effectively prevents bearing seizure from proceeding when bearing seizure prevention is controlled by maintaining the RPM of the engine 3 at 2,000 RPM in the limp-home mode.

As a result, the bearing controller 10 prevents bearing damage from proceeding to bearing seizure due to an increase in temperature according to the increase of the RPM of the engine 3 by limiting the RPM of the engine 3 to 2,000 RPM in the single sensor mode 2 (S100-2) in addition to the limp-home mode when bearing seizure prevention is controlled.

FIG. 5 illustrates an example of the vehicle 1 controlled in the single sensor mode 1 (S100-1) or single sensor mode 2 (S100-2).

As illustrated in FIG. 5, the bearing controller 10 determines the bearing damage by matching the data input from the knock sensor 8 with the data of the single sensor map 10-1 (S130), and then transmits a limp-home signal to the CVVT system 4 while transmitting a warning light ON signal to the warning light 5. Then, the warning light 5 is turned on to warn a possibility of bearing damage, and the CVVT system 4 performs the limp-home mode. Particularly, the bearing controller 10 operates the CVVT system 4 at a default value in the limp-home mode, and maintains the RPM of the engine at about 1,000 to 2,000 RPM in the single sensor mode 1 (S100-1) or at about 2,000 RPM in the single sensor mode 2 (S100-2).

As a result, the engine 3 is operated without a risk of bearing seizure progress due to an increase in engine RPM and without engine stall due to lowering of engine RPM in the condition of bearing damage bringing about bearing seizure in the vehicle 1.

Figure 6:
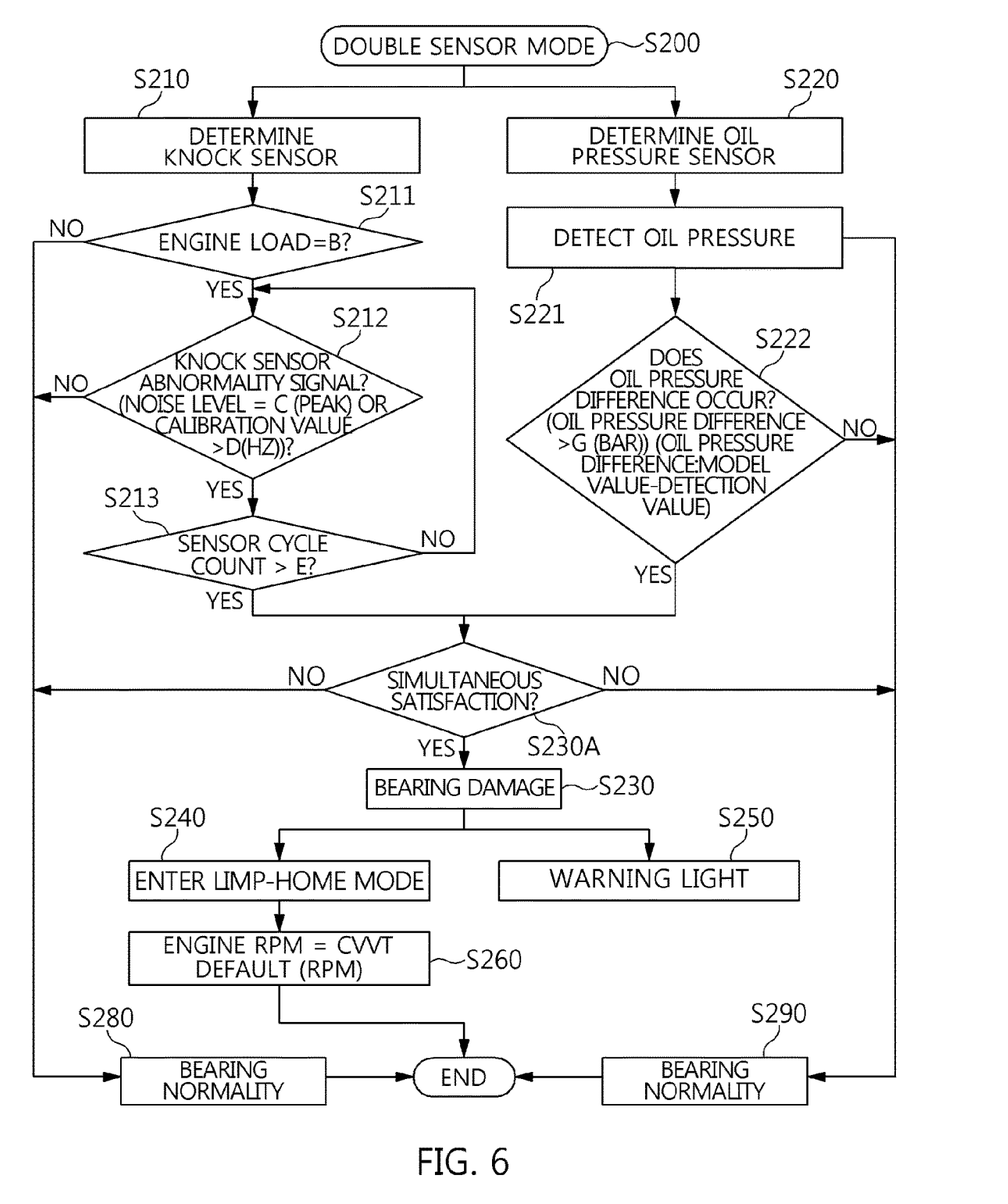
FIG. 6 is a flowchart illustrating a double sensor mode for preventing bearing seizure according to the embodiment of the present disclosure.
Figure 7:
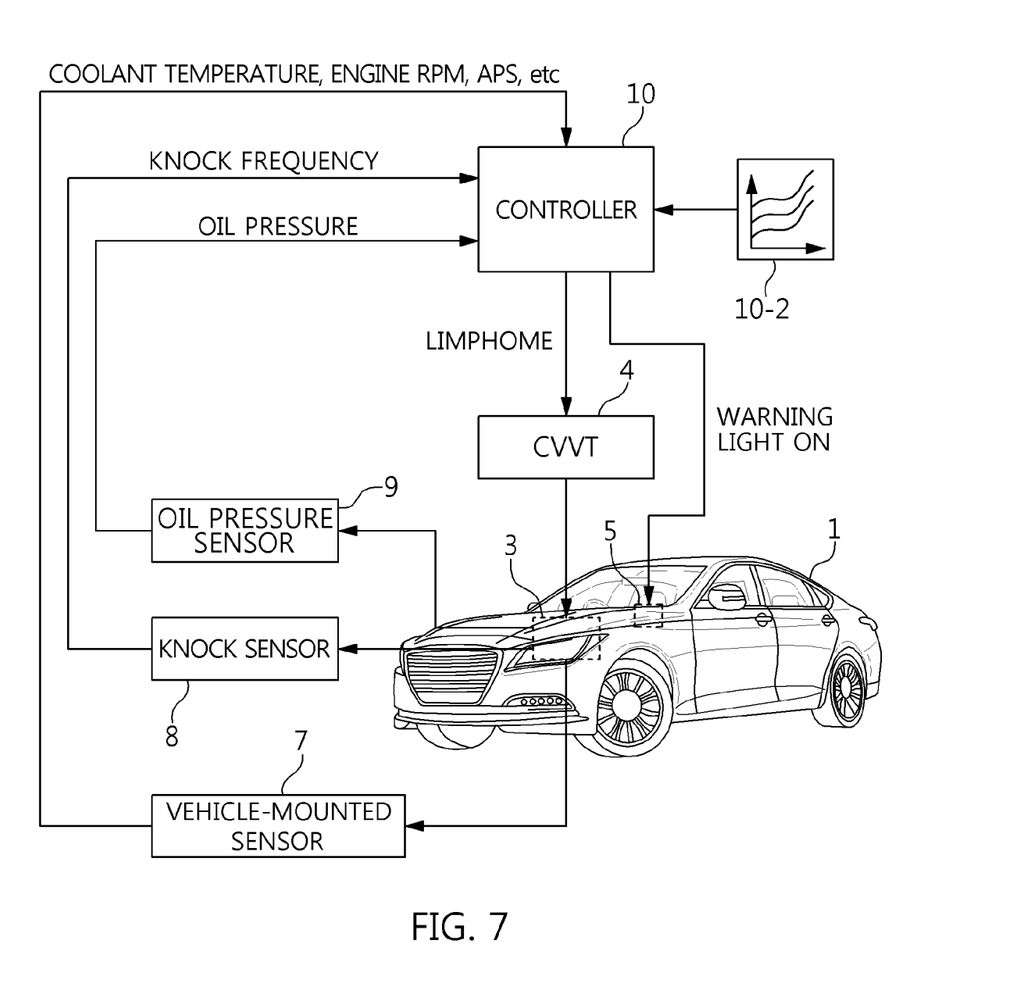
FIG. 7 is a block diagram illustrating a state in which the double sensor mode is implemented in the vehicle according to the embodiment of the present disclosure.

FIGS. 6 and 7 illustrate a method of controlling the double sensor mode and an example of the vehicle 1 using the same.

Referring to FIG. 6, in the double sensor mode (S200), it is possible to effectively prevent a possibility of miscalculation using two sensors by considering the oil pressure sensor 9 for detecting a difference in oil pressure in the entire section of the engine 3, based on the knock sensor 8 for detecting strong signals of metal strike due to bearing damage having impact characteristics in proportion to the engine load.

For example, the CVVT following is deteriorated due to a drop in oil pressure capable of moving the CVVT system 4, and the difference between the oil pressure model value according to the driving condition of the engine and the oil pressure value measured actually is based on showing an engine problem by detecting a difference in engine oil pressure in the entire section of the engine 3. Therefore, when the oil pressure sensor 9 is used to monitor bearing damage and seizure regardless of the driving region of the engine 3, the oil pressure sensor 9 has to be used to determine bearing seizure together with the knock sensor 8 in order to compensate a drop in pressure which may allow the actual measured oil pressure to be caused by oil dilution due to fuel or a lack of oil.

To this end, the bearing controller 10 performs a step of determining a knock sensor S210, a step of determining an oil pressure sensor S220, a step of satisfying a bearing damage condition S230A, a step of checking bearing damage S230, a step of entering a limp-home mode S240, a step of turning on a warning light S250, and a step of controlling an engine RPM S260 in the double sensor mode (S200).

Each of them is as follows.

The knock sensor determination (S210) is divided into a step of applying an engine load by "engine load=B" S211, a step of applying a knock sensor abnormality signal by "noise level=C or calibration value>D" S212, and a step of applying a sensor cycle by "sensor cycle count>E" S213. Therefore, the knock sensor determination (S210) is the same as steps S111, S112, and S113 of the knock sensor determination (S110) applied to the single sensor mode 1 of FIG. 3. However, the knock sensor determination (S210) differs from the knock sensor determination (S110) in that when the knock sensor abnormality signal is checked to be detected, the process does not directly proceed to the step of checking bearing damage S230 but it proceeds to the step of satisfying a bearing damage condition S230A.

The oil pressure sensor determination (S220) is performed by a step of detecting an oil pressure S221 and a step of determining whether a difference in oil pressure occurs S222. For example, the oil pressure detection (S221) is performed to detect a value by the oil pressure sensor 9, and the oil pressure difference occurrence determination (S222) is performed by applying an oil pressure detection value and an oil pressure model value to the following equation.

Oil pressure difference determination: oil pressure difference>G.

Here, ">" is a sign of inequality indicative of the size between two values, and "oil pressure difference>G (bar)" means that the oil pressure difference is larger than "G". "Oil pressure difference" is a value obtained by subtracting the actual detection value from the model value, and "G" is a pressure correction value obtained by reflecting the type of oil, the oil temperature, and the variation in oil viscosity and is set as 0.6 bar. The reason is because the oil pressure model value is corrected by the actual pressure sensor in the condition of the oil temperature and the specific RPM (e.g., engine warm-up RPM) after initial starting of the engine 3. The reason is because the engine oil pressure refers to a pressure value, which varies depending on the type of oil used actually, the oil temperature, and the engine RPM, and particularly oil viscosity is varied depending on the degree of dilution in the vehicle use environment.

Therefore, when the oil pressure difference is not larger than "G" in the oil pressure difference occurrence determination (S222), the process is terminated by determining that the bearing is normal as in S290. On the other hand, when the oil pressure difference is larger than "G", an engine oil pressure drop signal is transmitted to the step of satisfying a bearing damage condition S230A.

The bearing damage condition satisfaction (S230A) is performed to detect both of the knock sensor abnormality signal in the knock sensor determination (S210) and the engine oil pressure drop signal in the oil pressure sensor determination (S220). Therefore, when the bearing controller 10 detects only the knock sensor abnormality signal, the process is terminated by determining that the bearing is normal as in S280. Alternatively, when the bearing controller 10 detects only the engine oil pressure drop signal, the process is terminated by determining that the bearing is normal as in S290.

On the other hand, when the bearing controller 10 detects both of the knock sensor abnormality signal and the engine oil pressure drop signal, the process proceeds to the step of checking bearing damage S230.

After the step of checking bearing damage S230, the step of entering a limp-home mode S240, the step of turning on a warning light S250, and the step of controlling an engine RPM S260 are performed according to the check of the bearing damage to prevent the bearing damage from proceeding to bearing seizure.

To this end, the bearing controller 10 controls the engine 3 by setting the control condition of the CVVT system 4 as a default condition to prevent the bearing damage from proceeding to bearing seizure through the limp-home mode entry (S140), and warns the driver of the vehicle 1 of bearing damage by turning on the warning light (S150).

Particularly, the bearing controller 10 controls the RPM of the engine (3) in a specified state by applying the following equation in the engine RPM control (S160) after the limp-home mode entry (S140).

Engine RPM control: engine RPM=CVVT system default speed (RPM).

Here, "=" is a sign of inequality indicative of the size between two values, and "engine RPM=CVVT system default RPM" means that the engine RPM is the same as the CVVT system default RPM. "Engine RPM" is an RPM of the engine 3 detected actually, and "CVVT system default RPM" is an engine RPM in the limp-home mode.

As a result, the bearing controller 10 prevents the bearing damage from proceeding to bearing seizure due to an increase in temperature according to the increase of the RPM of the engine 3 by maintaining the RPM of the engine 3 at the CVVT system default RPM in the double sensor mode in addition to the limp-home mode when bearing seizure prevention is controlled.

FIG. 7 illustrates an example of the vehicle 1 controlled in the double sensor mode (S200).

As illustrated in FIG. 7, the bearing controller 10 determines the bearing damage by matching the data input from the knock sensor 8 and the oil pressure sensor 9 with the data of the double sensor map 10-2 (S230), and then transmits a limp-home signal to the CVVT system 4 while transmitting a warning light ON signal to the warning light 5. Then, the warning light 5 is turned on to warn a possibility of bearing damage, and the CVVT system 4 performs the limp-home mode.

As a result, the engine 3 is operated without a risk of bearing seizure progress due to an increase in engine RPM in the condition of bearing damage bringing about bearing seizure in the vehicle 1.

Figure 8:
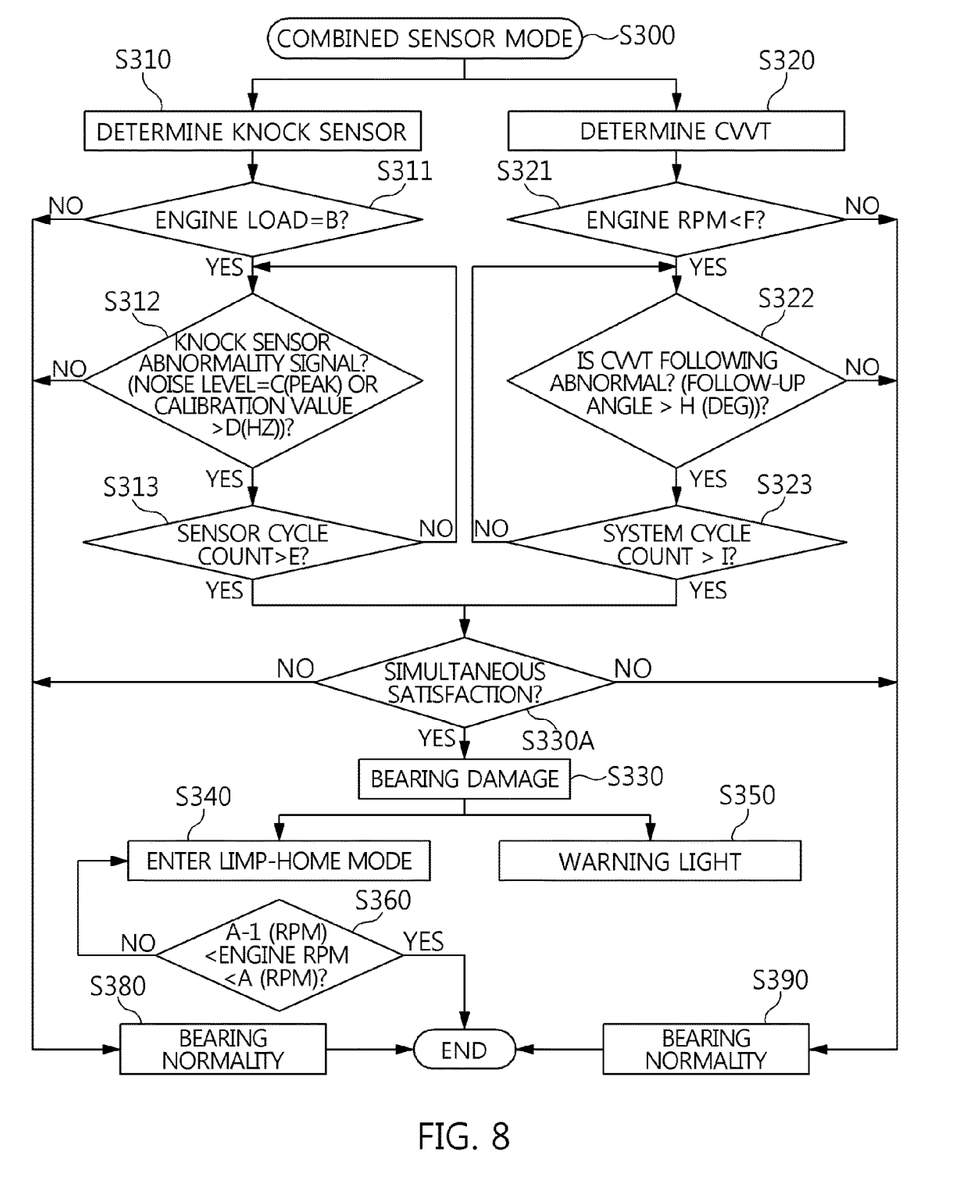
FIG. 8 is a flowchart illustrating a combined sensor mode for preventing bearing seizure according to the embodiment of the present disclosure.
Figure 9:
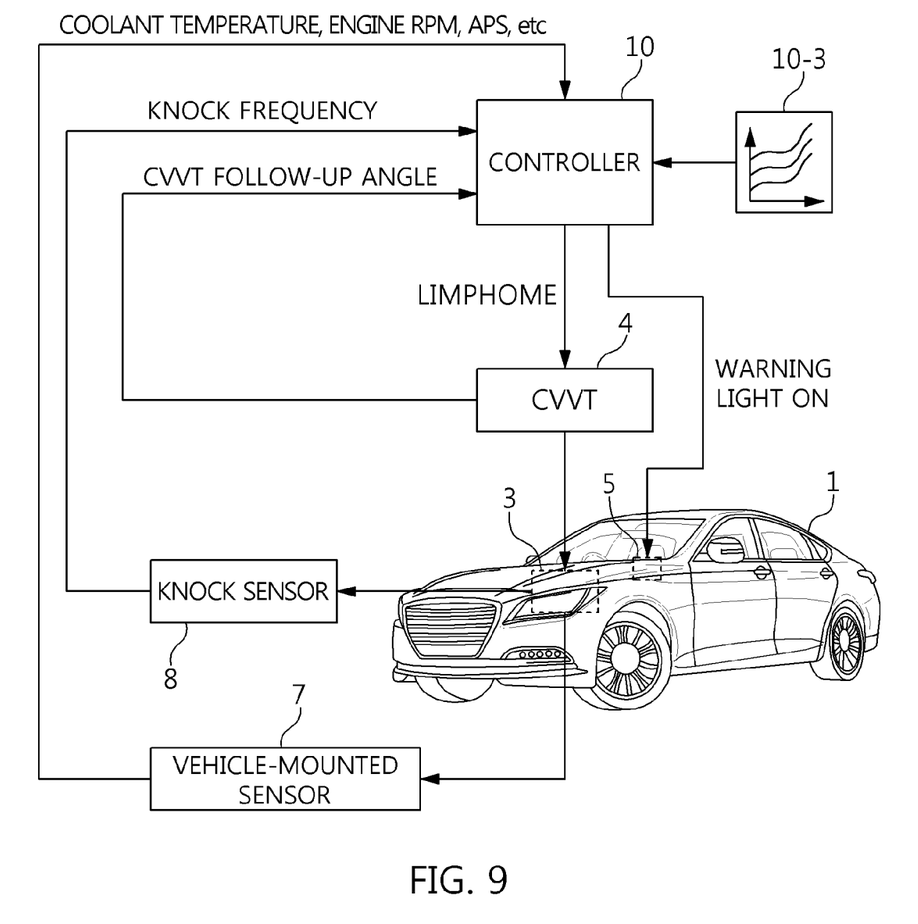
FIG. 9 is a block diagram illustrating a state in which the combined sensor mode is implemented in the vehicle according to the embodiment of the present disclosure.

FIGS. 8 and 9 illustrate a method of controlling the combined sensor mode and an example of the vehicle 1 using the same.

Referring to FIG. 8, in the combined sensor mode (S300), it is possible to effectively prevent a possibility of miscalculation of the knock sensor 4 using the CVVT system 4 functioning as the oil pressure sensor by considering the CVVT system 4 having CVVT following related to the engine oil pressure, based on the knock sensor 8 for detecting strong signals of metal strike due to bearing damage having impact characteristics in proportion to the engine load.

The bearing controller 10 performs a step of determining a knock sensor S310, a step of determining a CVVT S320, a step of satisfying a bearing damage condition S330A, a step of checking bearing damage S330, a step of entering a limp-home mode S340, a step of turning on a warning light S350, and a step of controlling an engine RPM S360 in the combined sensor mode (S300).

Each of them is as follows.

The knock sensor determination (S310) is divided into a step of applying an engine load by "engine load=B" S311, a step of applying a knock sensor abnormality signal by "noise level=C or calibration value>D" S312, and a step of applying a sensor cycle by "sensor cycle count>E" S313. Therefore, the knock sensor determination (S310) is the same as steps S111, S112, and S113 of the knock sensor determination (S110) applied to the single sensor mode 1 of FIG. 3. However, the knock sensor determination (S310)

differs from the knock sensor determination (S110) in that when the knock sensor abnormality signal is checked to be detected, the process does not directly proceed to the step of checking bearing damage S330 but it proceeds to the step of satisfying a bearing damage condition S330A.

The CVVT determination (S320) is divided into a step of applying an engine RPM S321, a step of determining whether CVVT following is abnormal S322, and a step of counting a system cycle S323, and the following equation is applied to the CVVT determination.

Engine RPM suitability detection: engine RPM>F,

CVVT following abnormality detection: CVVT follow-up angle>H (deg), and

CVVT following abnormality check: system cycle count>I.

Here, ">" is a sign of inequality indicative of the size between two values, "engine RPM>F" means that the engine RPM is larger than "F", "CVVT follow-up angle>H" means that the CVVT follow-up angle is larger than "H", and "system cycle count>I" means that the system cycle count is larger than "I". "Engine RPM" is an RPM of the engine 3 detected actually, and "F" is a value set as an RPM at which there is present a supply amount of engine oil that makes difficult to check the CVVT following and is set to be 60 miles or more. "CVVT follow-up angle" is a follow-up angle of the CVVT system 4 measured actually, "H" is a value set to be 5° or more at which the CVVT following is deteriorated. "System cycle count" is the number of times, and "I" is a set value and refers to three cycles when abnormality of the CVVT follow-up angle of 5° occurring once is set as one cycle.

Particularly, since a large amount of oil is supplied to the engine in a specific RPM or more, it is difficult for the engine oil pressure related to the CVVT following to check bearing seizure by the CVVT following in the step of applying an engine RPM S321. Therefore, a monitoring region (limited by RPM) has to be set.

When the engine RPM is smaller than "F", the process is terminated by determining that the bearing is normal as in S390. When the engine RPM is larger than "F" and the CVVT follow-up angle is smaller than "H", the process is terminated by determining that the bearing is normal as in S390.

On the other hand, when the engine RPM is larger than "F", the CVVT follow-up angle is larger than "H", and the system cycle count is larger than "I", a CVVT following abnormality signal is generated and transmitted to the step of satisfying a bearing damage condition S330A.

The bearing damage condition satisfaction (S330A) is performed to detect both of the knock sensor abnormality signal in the knock sensor determination (S310) and the CVVT follow-up angle abnormality signal in the CVVT determination (S320). Therefore, when the bearing controller 10 detects only the knock sensor abnormality signal, the process is terminated by determining that the bearing is normal as in S380. Alternatively, when the bearing controller 10 detects only the CVVT follow-up angle abnormality signal, the process is terminated by determining that the bearing is normal as in S380.

On the other hand, when the bearing controller 10 detects both of the knock sensor abnormality signal and the CVVT follow-up angle abnormality signal, the process proceeds to the step of checking bearing damage S330.

After the step of checking bearing damage S330, the step of entering a limp-home mode S340, the step of turning on a warning light S350, and the step of controlling an engine RPM S360 are performed according to the check of the bearing damage to prevent the bearing damage from proceeding to bearing seizure.

To this end, the bearing controller 10 controls the engine 3 by setting the control condition of the CVVT system 4 as a default condition to prevent the bearing damage from proceeding to bearing seizure through the limp-home mode entry (S340), and warns the driver of the vehicle 1 of bearing damage by turning on the warning light (S350).

Particularly, the bearing controller 10 controls the RPM of the engine (3) in a specified state by applying the engine RPM control equation of "a−1 (RPM)<engine RPM<a (RPM)" in the engine RPM control (S360) after the limp-home mode entry (S340).

Therefore, the engine RPM control (S360) is the same as the engine RPM control (S160) applied to the single sensor mode 1 of FIG. 3.

As a result, the bearing controller 10 controls the engine 3 without engine stall even though the bearing is damaged by limiting the RPM of the engine 3 to 1,000 RPM, which is a lower limit value, in the combined sensor mode (S300) in addition to the limp-home mode when bearing seizure prevention is controlled, and further prevents the bearing damage from proceeding to bearing seizure due to an increase in temperature according to the increase of the RPM of the engine 3 by limiting the RPM of the engine 3 to 2,000 RPM which is an upper limit value.

FIG. 9 illustrates an example of the vehicle 1 controlled in the combined sensor mode (S300).

As illustrated in FIG. 9, the bearing controller 10 determines the bearing damage by matching the data input from the knock sensor 8 and the CVVT follow-up angle of the CVVT system 4 with the data of the combined sensor map 10-3 (S130), and then transmits a limp-home signal to the CVVT system 4 while transmitting a warning light ON signal to the warning light 5. Then, the warning light 5 is turned on to warn a possibility of bearing damage, and the CVVT system 4 performs the limp-home mode. Particularly, the bearing controller 10 operates the CVVT system 4 at a default value in the limp-home mode, and maintains the RPM of the engine at about 1,000 to 2,000 RPM in the single sensor mode 1 (S100-1) or at about 2,000 RPM in the single sensor mode 2 (S100-2).

As a result, the engine 3 is operated without a risk of bearing seizure progress due to an increase in engine RPM and without engine stall due to lowering of engine RPM in the condition of bearing damage bringing about bearing seizure in the vehicle 1.

As described above, the method of preventing bearing seizure for the vehicle 1 according to the embodiment of the present disclosure uses each of the abnormal signal detected by the knock sensor 8, the difference between the engine oil pressure detected by the engine oil pressure sensor 9 and the oil pressure model value, the CVVT follow-up angle abnormality of the CVVT system 4 as the bearing seizure detection factor by the bearing controller 10, detects the damage of the bearing applied to the engine 3 in the operation of the engine 3 in which the state of the bearing seizure detection factor is changed, and prevents engine stall and bearing seizure progress by engine control using the bearing seizure detection factor when the bearing damage is detected. Thus, it is possible to effectively prevent engine stall from developing into a vehicle safety problem together with bearing seizure developing into total engine failure by previously detecting the bearing damage.

The vehicle of the present disclosure has the following advantages and effects by previously detecting bearing damage through monitoring and blocking bearing seizure from proceeding through engine control.

Firstly, it is possible to fundamentally prevent bearing seizure by initially detecting and coping with the bearing damage. Secondly, it is possible to rapidly handle bearing seizure by switching to a limp-home mode, which is CVVT default control, while turning on a warning light in the event of danger of bearing seizure. Thirdly, it is possible to fundamentally resolve engine stall and total engine failure caused due to bearing seizure by switching to the limp-home mode. Fourthly, since applicable equipment such as a knock sensor, an oil pressure sensor, and a CVVT is used, it is unnecessary to additionally use hardware bringing about an increase in cost to prevent bearing seizure. Fifthly, it is possible to control bearing seizure prevention in various manners using the combination of the knock sensor, the oil pressure sensor, and the CVVT.

While the present disclosure has been described with respect to the specific embodiments, it will be apparent to those skilled in the art that various changes and modifications may be made without departing from the spirit and scope of the disclosure as defined in the following claims.

What is claimed is:

1. A method of preventing bearing seizure, the method comprising:
   using a knock sensor as a bearing seizure detection factor by a bearing controller;
   detecting damage of a bearing applied to an engine during operation of the engine in which a state of the bearing seizure detection factor is changed; and
   performing engine control using the bearing seizure detection factor when the bearing damage is detected.

2. The method of claim 1, wherein the knock sensor is independently used as the bearing seizure detection factor, or is used in a combination with an engine oil pressure sensor or a CVVT system as the bearing seizure detection factor.

3. The method of claim 2, wherein:
   the knock sensor is used as the bearing seizure detection factor in a single sensor mode for the detection of the bearing damage; and
   the single sensor mode is divided into a first single sensor mode, in which the bearing damage is detected by reflecting a knock sensor abnormality signal detected by the knock sensor and a degree of ignition timing retard in a cylinder of the engine, and a second single sensor mode in which the bearing damage is detected by reflecting a strength of the knock sensor abnormality signal detected by the knock sensor.

4. The method of claim 3, wherein the first single sensor mode is performed by determining a load of the engine when the knock sensor abnormality signal is detected by the knock sensor, determining a noise level of the knock sensor abnormality signal when a condition of the engine load is satisfied, counting a number of times the noise level occurs as a sensor cycle when a condition of the noise level is satisfied, checking the cylinder of the engine in which the ignition timing is retarded when the number of times the noise level occurs reaches a condition of a sensor cycle count, turning on a warning light to inform of the bearing damage while switching to a limp-home mode of the CVVT system by checking the bearing damage when the cylinder is checked, and limiting an RPM of the engine.

5. The method of claim 4, wherein the condition of the engine load is a vehicle speed, the condition of the noise level is a peak noise level, the condition of the sensor cycle count is three cycles when cumulative specific times of the peak noise level is set as one cycle, the RPM is divided into a lower limit RPM and an upper limit RPM, the lower limit RPM is an RPM at which the engine is stalled, and the upper limit RPM is an RPM at which the bearing is not fused in the limp-home mode.

6. The method of claim 3, wherein the first single sensor mode is performed by determining knock of the engine when the knock sensor abnormality signal is detected by the knock sensor, determining a signal strength by applying a filter to the knock sensor abnormality signal when a condition of the engine knock is not satisfied, turning on a warning light to inform of the bearing damage while switching to a limp-home mode of the CVVT system by checking the bearing damage when a condition of the signal strength is satisfied, and limiting an RPM of the engine.

7. The method of claim 6, wherein the condition of the engine knock is a lambda region frequency, the filter is a band pass filter, and the RPM is an upper limit RPM at which the bearing is not fused in the limp-home mode.

8. The method of claim 2, wherein:
   the knock sensor and the engine oil pressure sensor are used as the bearing seizure detection factor in a double sensor mode for the detection of the bearing damage; and
   the double sensor mode is performed to detect the bearing damage by reflecting a knock sensor abnormality signal detected by the knock sensor and an oil pressure signal detected by the engine oil pressure sensor.

9. The method of claim 8, wherein the double sensor mode is performed by satisfying a condition of a noise level of the knock sensor abnormality signal in a state in which a condition of a load of the engine is satisfied when the knock sensor abnormality signal is detected by the knock sensor and then checking the knock sensor abnormality signal as a detection signal when a number of times a noise level occurs reaches a condition of a sensor cycle count, calculating an oil pressure difference between a model oil pressure value and a measured oil pressure value when the oil pressure signal is detected by the engine oil pressure sensor, checking an engine oil pressure drop signal when a condition of the oil pressure difference is satisfied, turning on a warning light to inform of the bearing damage while switching to a limp-home mode of the CVVT system by checking the bearing damage when the knock sensor abnormality signal and an engine oil pressure drop signal are simultaneously detected, and limiting an RPM of the engine.

10. The method of claim 9, wherein the condition of the engine load is a vehicle speed, a condition of the noise level is a peak noise level, the condition of the sensor cycle count is three cycles when cumulative specific times of the peak noise level is set as one cycle, the condition of the oil pressure difference is a pressure correction value, and the RPM is a default RPM of the CVVT system of the engine.

11. The method of claim 2, wherein:
   the knock sensor and the CVVT system are used as the bearing seizure detection factor in a combined sensor mode for the detection of the bearing damage; and
   the combined sensor mode is performed to detect the bearing damage by reflecting a knock sensor abnormality signal detected by the knock sensor and a CVVT follow-up angle of the CVVT system.

12. The method of claim 11, wherein the combined sensor mode is performed by satisfying a condition of a noise level of the knock sensor abnormality signal in a state in which a condition of a load of the engine is satisfied when the knock sensor abnormality signal is detected by the knock sensor and then checking the knock sensor abnormality signal as a detection signal when a number of times the noise level occurs reaches a condition of a sensor cycle count, satisfying a condition of the CVVT follow-up angle of the CVVT system in a state in which a condition of an RPM of the engine is satisfied and then checking a CVVT follow-up angle abnormality signal when a number of times abnormality of the CVVT follow-up angle occurs reaches a condition of a system cycle count, turning on a warning light to inform of the bearing damage while switching to a limp-home mode of the CVVT system by checking the bearing damage when the knock sensor abnormality signal and the CVVT follow-up angle abnormality signal are simultaneously detected, and limiting the RPM of the engine.

13. The method of claim 12, wherein the condition of the engine load is a vehicle speed, the condition of the noise level is a peak noise level, the condition of the sensor cycle count is three cycles when cumulative specific times of the peak noise level is set as one cycle, the RPM is divided into a lower limit RPM and an upper limit RPM, the lower limit RPM is an RPM at which the engine is stalled, and the upper limit RPM is an RPM at which the bearing is not fused in the limp-home mode.

14. The method of claim 12, wherein the condition of the engine RPM is an RPM at which there is present a supply amount of engine oil that inhibits checking CVVT following, the condition of the CVVT follow-up angle abnormality is a follow-up angle at which the CVVT following is deteriorated, and the condition of the system cycle count is three cycles when the CVVT follow-up angle abnormality occurring once is set as one cycle.

15. A vehicle comprising:
an engine in which a bearing is applied to a rotary system;
a continuously variable valve timing (CVVT) system configured to control an ignition timing of the engine;
a knock sensor configured to detect vibration of the engine;
an engine oil pressure sensor configured to detect a pressure of oil supplied to the engine; and
a bearing controller configured to:
use at least one of a knock sensor abnormality signal detected by the knock sensor, an oil pressure difference between the engine oil pressure detected by the engine oil pressure sensor and a model oil pressure value, and CVVT follow-up angle abnormality of the CVVT system as a bearing seizure detection factor;
detect damage of the bearing from a change in state of the bearing seizure detection factor during operation of the engine; and
perform control of the engine to prevent bearing seizure.

16. The vehicle of claim 15, wherein the bearing controller uses the knock sensor, or uses a combination of the knock sensor and the engine oil pressure sensor or a combination of the knock sensor and the CVVT system, as the bearing seizure detection factor.

17. The vehicle of claim 16, wherein the bearing controller comprises a single sensor map for the knock sensor, a double sensor map for the knock sensor and the engine oil pressure sensor, or a combined sensor map for the knock sensor and the CVVT system.

18. The vehicle of claim 16, wherein the bearing controller informs of the bearing damage using a warning light.

19. A non-transitory computer readable medium comprising:
a processor programmed to:
use one or more of a knock sensor, an engine oil pressure sensor, and a continuously variable valve timing (CVVT) system as a bearing seizure detection factor;
detect damage of a bearing applied to an engine during operation of the engine in which a state of the bearing seizure detection factor is changed; and
perform engine control using the bearing seizure detection factor when the bearing damage is detected.

* * * * *